(12) United States Patent
Gimbe

(10) Patent No.: US 8,973,943 B1
(45) Date of Patent: Mar. 10, 2015

(54) DOLLY ADAPTER

(71) Applicant: Daniel G. Gimbe, Takoma Park, MD (US)

(72) Inventor: Daniel G. Gimbe, Takoma Park, MD (US)

(*) Notice: Subject to any disclaimer, the term of this patent is extended or adjusted under 35 U.S.C. 154(b) by 0 days.

(21) Appl. No.: 14/336,773

(22) Filed: Jul. 21, 2014

(51) Int. Cl.
*B60R 9/06* (2006.01)
*B62B 5/00* (2006.01)

(52) U.S. Cl.
CPC .......................... *B62B 5/00* (2013.01)
USPC ........................................................ 280/769

(58) Field of Classification Search
USPC ................. 280/43, 43.1, 43.13, 47.21, 47.27, 280/47.22, 11.223, 769
See application file for complete search history.

(56) References Cited

U.S. PATENT DOCUMENTS

| 1,276,100 A | * | 8/1918 | Niznik ............................... 256/1 |
| 1,397,719 A | | 11/1921 | Bryan |
| 1,934,289 A | * | 11/1933 | White ............................ 414/446 |
| 4,281,813 A | * | 8/1981 | Garrity ............................ 248/97 |
| 5,427,493 A | | 6/1995 | Lucy |
| 5,975,826 A | | 11/1999 | Scholder |

* cited by examiner

*Primary Examiner* — John Walters
*Assistant Examiner* — James Triggs
(74) *Attorney, Agent, or Firm* — Crossley Patent Law

(57) ABSTRACT

A scissor fence having a top end, a bottom end, a plurality of alternating front legs and back legs, each leg having an outer section, a plurality of center pivots joining the front legs to the back legs, a mount comprising a final center pivot at the bottom end, wherein the mount is configured to affix to an existing dolly, a plurality of lateral pivots sequentially joining the outer sections of the front legs to the back legs, a hinge disposed on each leg, the hinges disposed most proximal the lateral pivots, a pair of spaced apart hooks affixed to the existing dolly, the scissor fence selectively expanded, the top end front leg and back leg removably hooked over the hooks, forming a barrier against the dolly, the scissor fence selectively collapsed and the outer sections folded to parallel the font legs and back legs.

1 Claim, 9 Drawing Sheets

DOLLY ADAPTER

BACKGROUND OF THE INVENTION

Various types of dollies are known in the prior art. However, dollies, whether two wheel dollies or platform dollies suffer from a like malady, i.e. retaining loads is sometimes difficult, as dollies are typically fully open. A two wheel dolly, also often known as a hand truck, offers somewhat of a barrier toward its rear, although such barriers are typically an inverted U with sometimes a cross piece or two. But, many dolly loads are wider than such a narrow barrier can support, and loaded items may also slip between the inverted U uprights. To see loads fall from dollies is so ubiquitous and to be almost comical. The same problem holds true for flat bed dollies that offer no lateral support of loaded items. What is needed is a dolly adapter that is easily installed and removed as needed, an adapter that provides a fence to retain items as desired on a dolly, whether hand truck or flat bed dolly. The present adapter fulfills these needs.

FIELD OF THE INVENTION

The present invention relates to dollies, and more particularly, to a dolly adapter that provides for a user to retain dolly loads.

SUMMARY OF THE INVENTION

The general purpose of the present dolly adapter, described subsequently in greater detail, is to provide a dolly adapter that has many novel features that result in a dolly adapter which is not anticipated, rendered obvious, suggested, or even implied by prior art, either alone or in combination thereof.

To accomplish this, the dolly adapter is configured to fit both a hand truck (two wheel dolly) and a platform dolly, with the same basic design with only minor variations in mounting. The dolly adapter includes a scissor fence having a top end, a bottom end, and a plurality of alternating front legs and back legs. Each of the front legs and back legs has an outer section. A center pivot separately and sequentially joins the front legs to the back legs, respectively. A mount comprises the final center pivot at the bottom end. The mount is configured to pivotally affix to the existing hand truck.

A lateral pivot sequentially joins a substantial number of the outer sections of the front legs to the back legs, respectively. A hinge is disposed on each front leg and each back leg. The hinges are disposed most proximal to the lateral pivots. A pair of spaced apart hooks is affixed to the existing dolly. The scissor fence is selectively expanded, the top end front leg and back leg removably hooked over the hooks. A barrier is formed against the dolly with the expanded scissor fence. Unhooking the top end provides for the scissor fence to selectively collapse to the mount. The outer sections are selectively folded inwardly to a position parallel the front legs and the back legs.

With a plurality of minor parts additions, the dolly adapter is also configured for use on an existing platform dolly. A pair of identical scissor fences is provided for use of the platform dolly. Each scissor fence comprises a top end, a bottom end and a plurality of alternating front legs and back legs. Each front leg at the top end and at the bottom end has a back segment. Each back leg at the top end and the bottom end has a front segment.

A plurality of center pivots separately and sequentially joins the front legs to the back legs, respectively. A plurality of lateral pivots separately and sequentially joins the front legs and the back legs, respectively. One lateral pivot joins each front segment to one back leg, respectively at the top end and the bottom end. One lateral pivot joins each back segment to one front leg, respectively, at the top end and the bottom end. A first horizontal member is pivotally affixed to the top end front segment and back segment. A second horizontal member is pivotally affixed to the bottom end front segment and the back segment. A middle pivot sequentially joins the front legs to the back legs, respectively. The middle pivots are disposed between the center pivots and the lateral pivots.

A pair of parallel spaced apart telescopic members is affixed to an existing platform dolly. The telescopic members are joined at a perpendicular to the second horizontal members of the two scissor fences. A duplicate pair of spaced apart telescopic rods is affixed to the existing platform dolly. A stanchion is pivotally affixed to an each end of the telescopic rods. Each stanchion has a stanchion top. A releasable fastener is affixed proximal to each stanchion top. The scissor fences are selectively positioned in an expanded state via the releasable fasteners.

Thus has been broadly outlined the more important features of the present dolly adapter so that the detailed description thereof that follows may be better understood and in order that the present contribution to the art may be better appreciated.

BRIEF DESCRIPTION OF THE DRAWINGS FIGURES

DETAILED DESCRIPTION OF THE DRAWINGS

Figure 1:
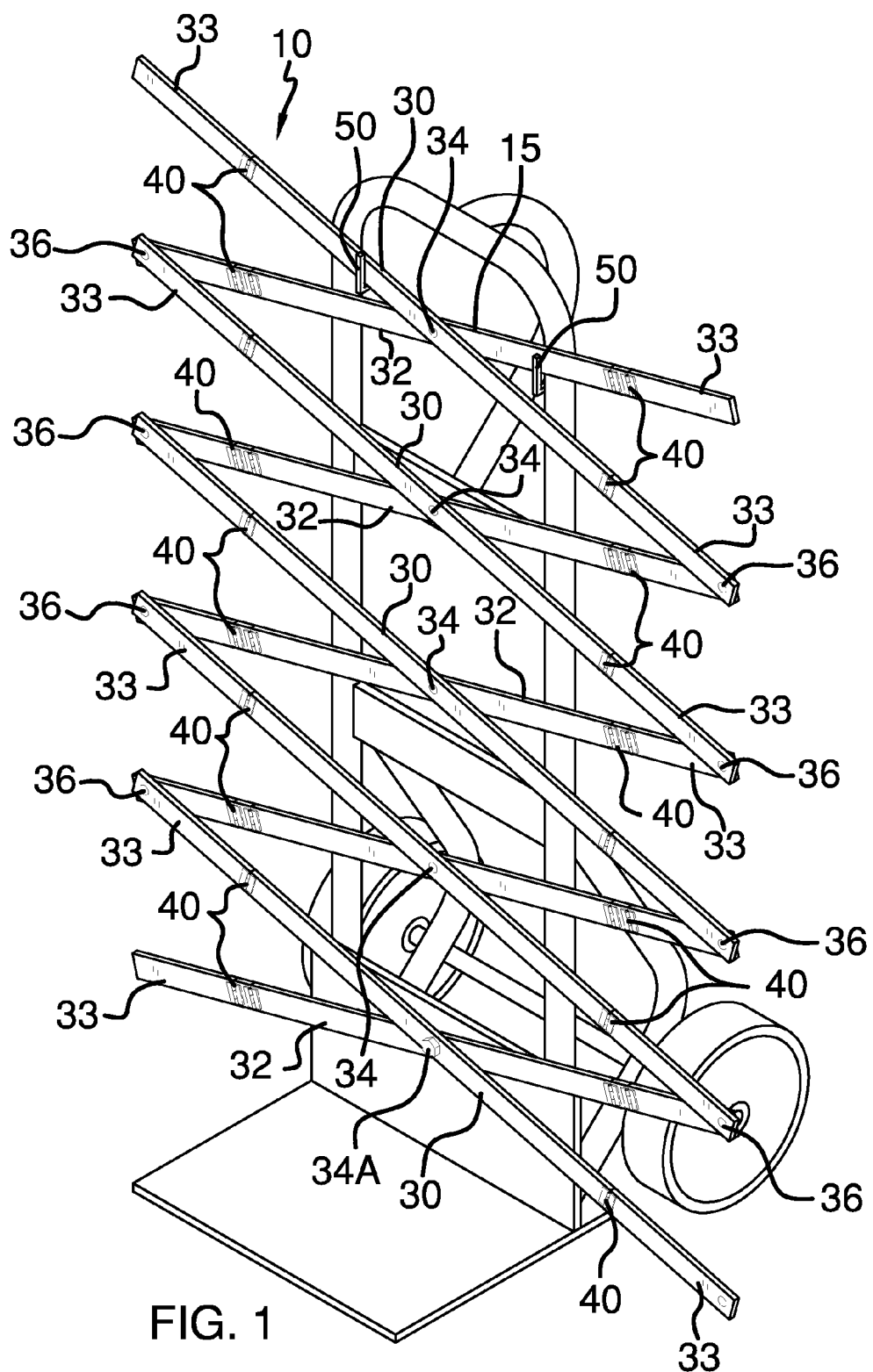
FIG. 1 is a perspective view of a dolly adapter installed on a hand truck.
Figure 2:
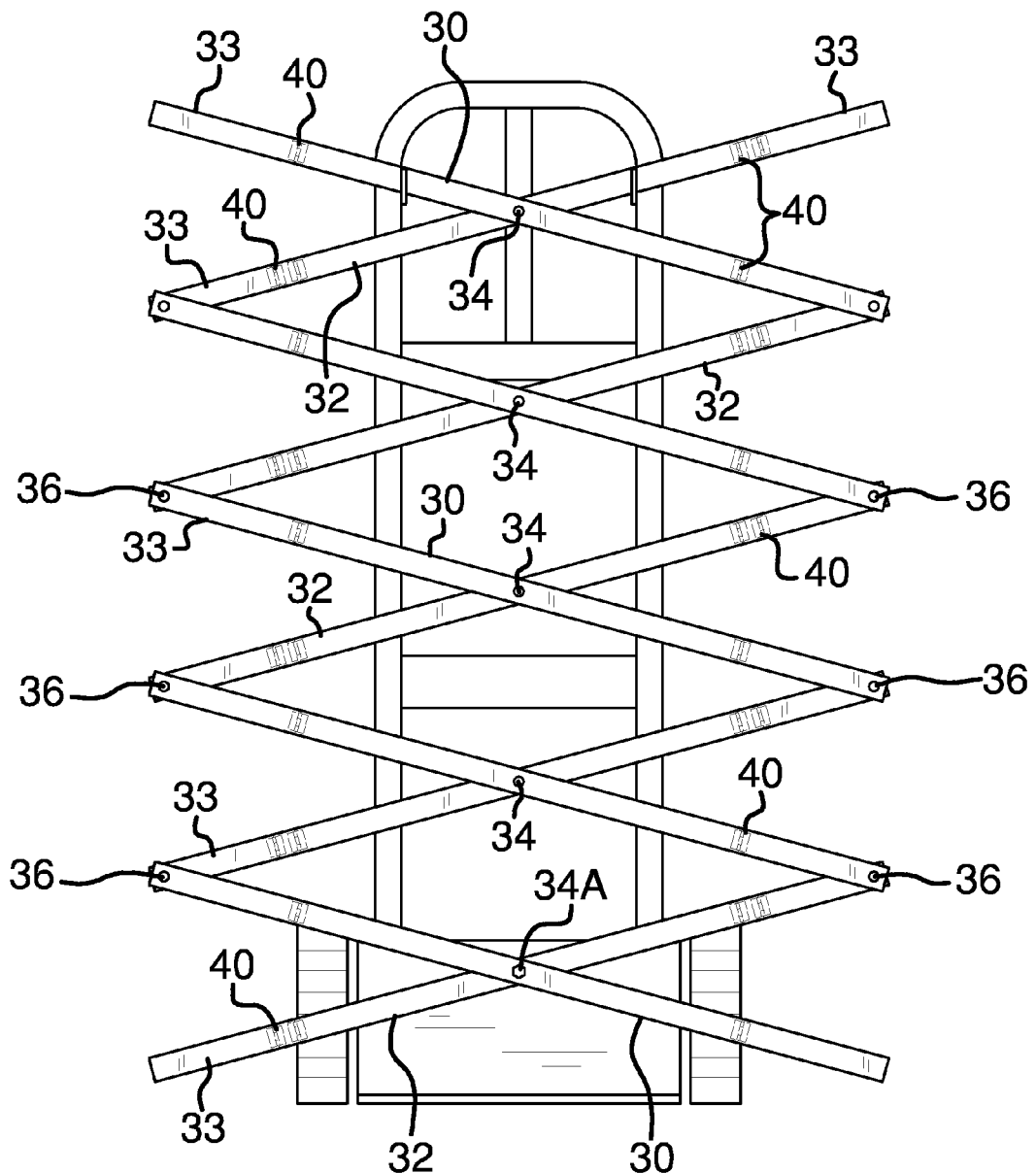
FIG. 2 is a front elevation view of the dolly adapter installed on the hand truck.
Figure 3:
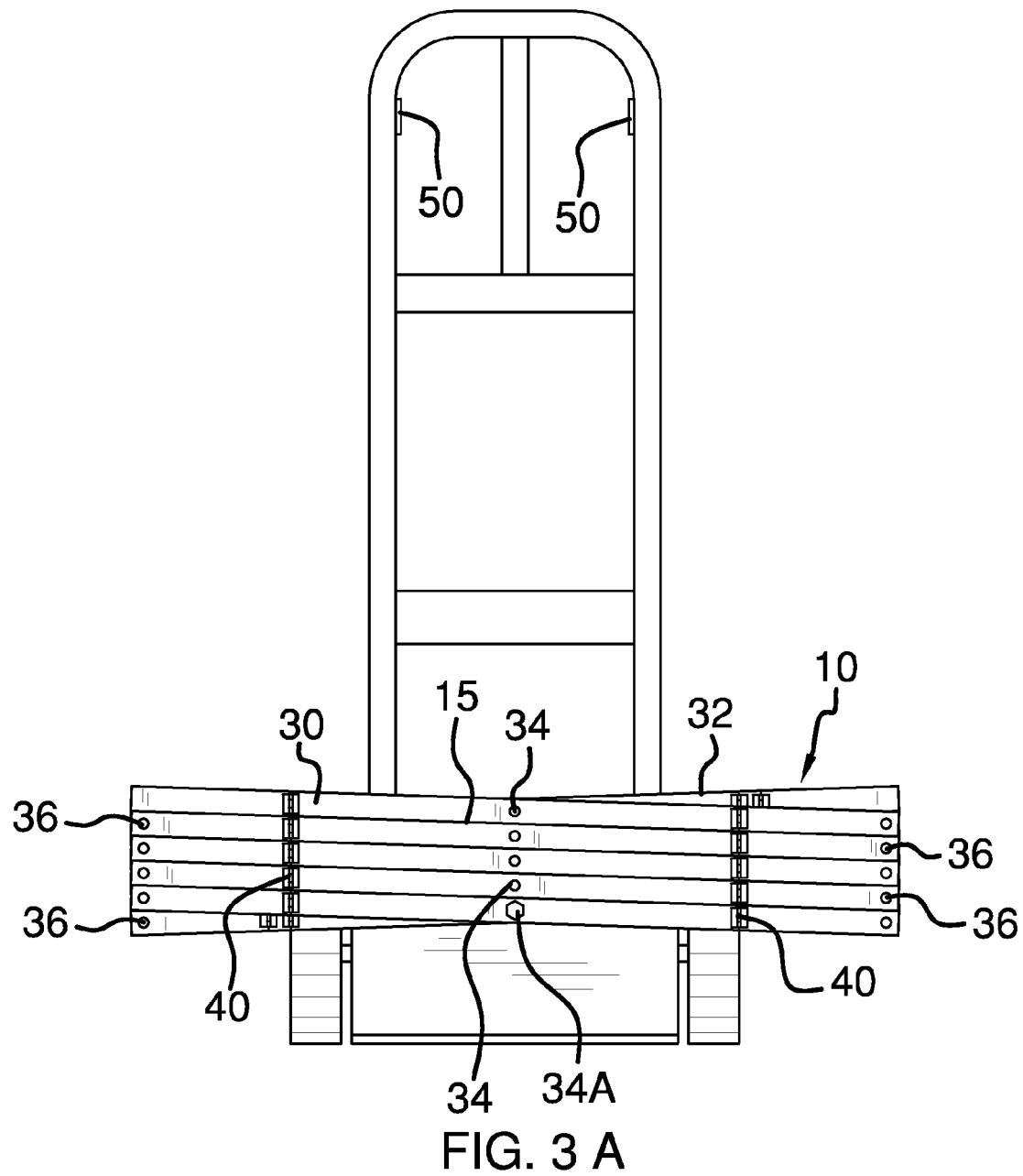
FIG. 3A is a front elevation view of the dolly adapter installed on the hand truck.
FIG. 3B is a front elevation view of the dolly adapter installed on the hand truck.
Figure 3:
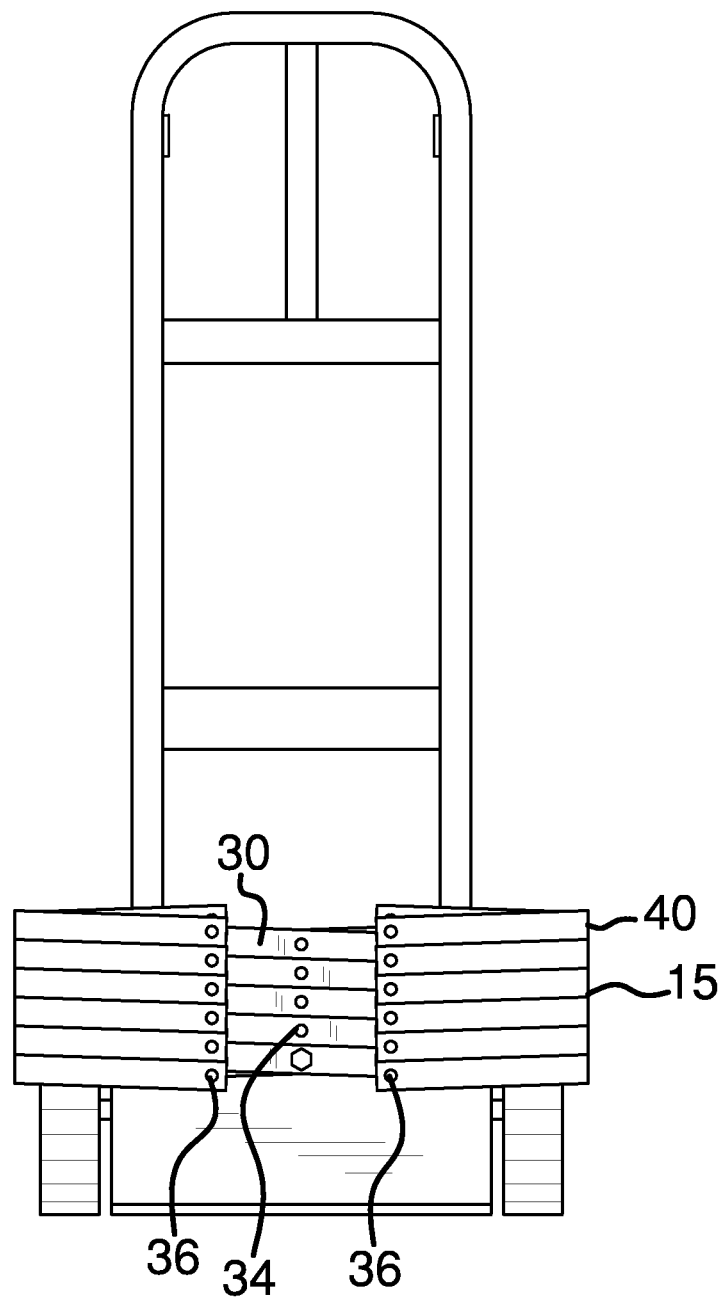
Figure 4:
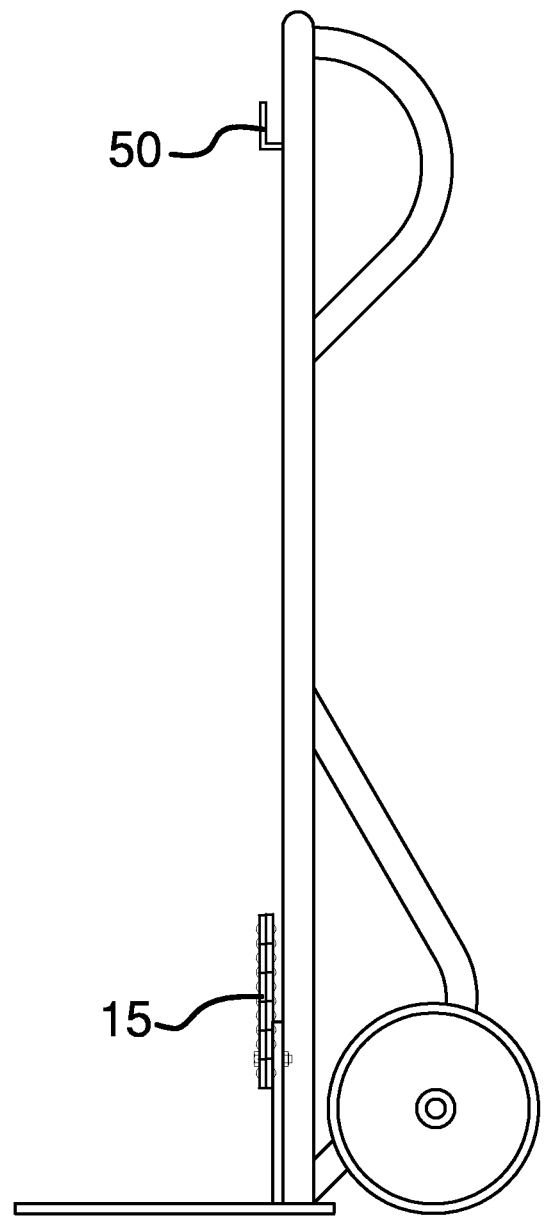
FIG. 4 is a lateral elevation view of the dolly adapter installed on the hand truck.
Figure 5:
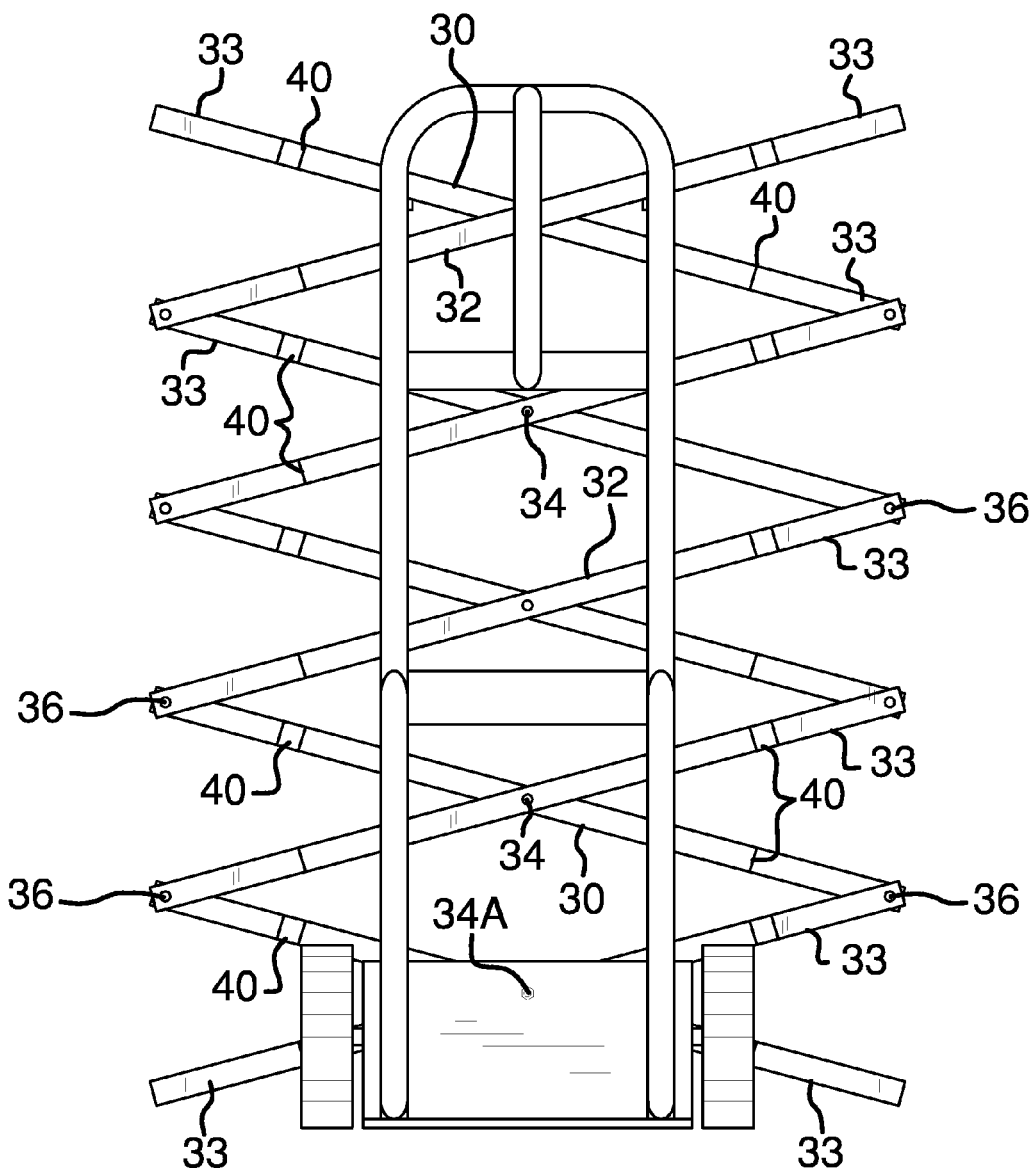
FIG. 5 is a back elevation view of the dolly adapter installed on the hand truck.
Figure 6:
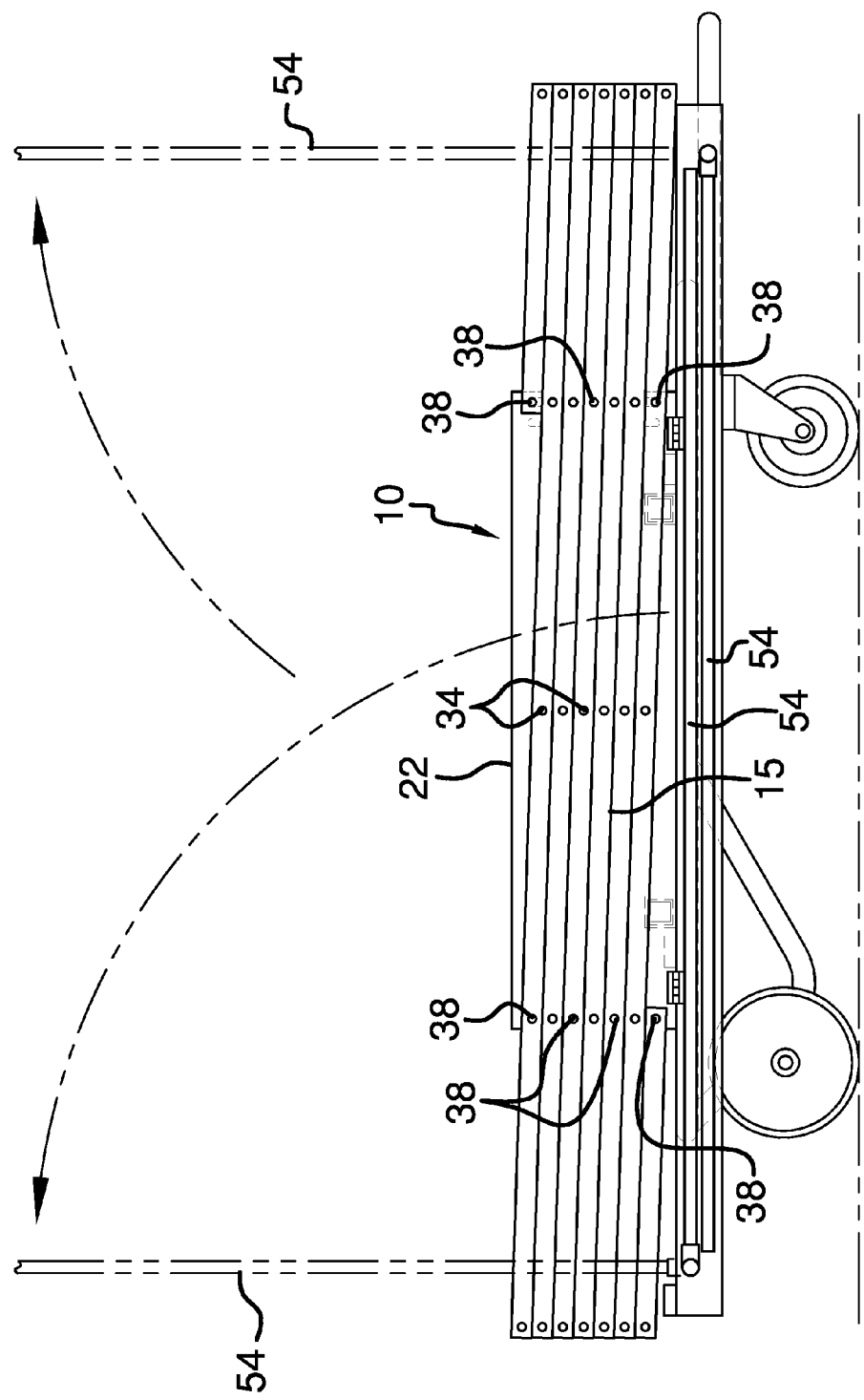
FIG. 6 is a lateral elevation view of the dolly adapter installed on a platform dolly.
Figure 7:
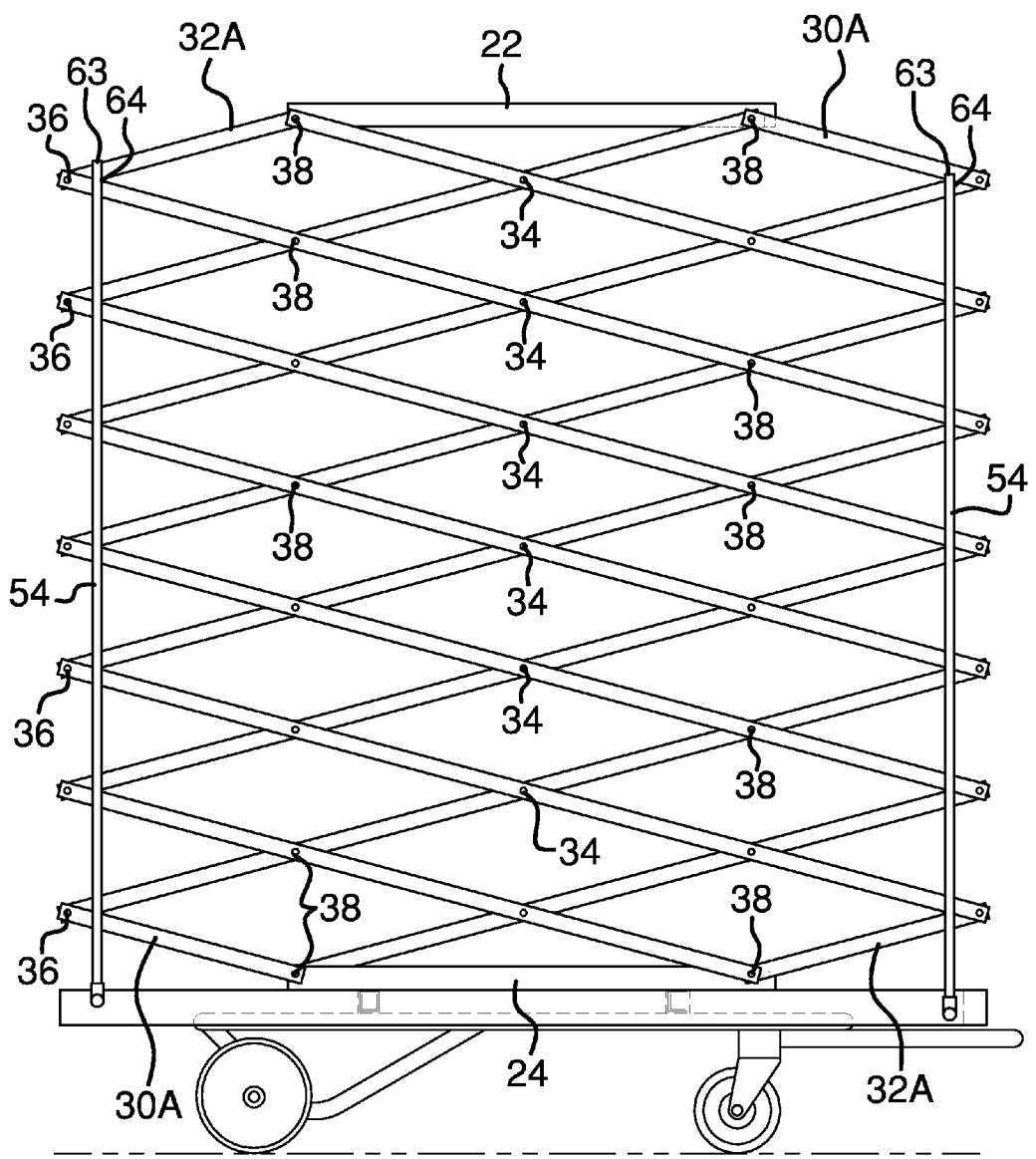
FIG. 7 is a lateral elevation view of the dolly adapter installed on the platform dolly.
Figure 8:
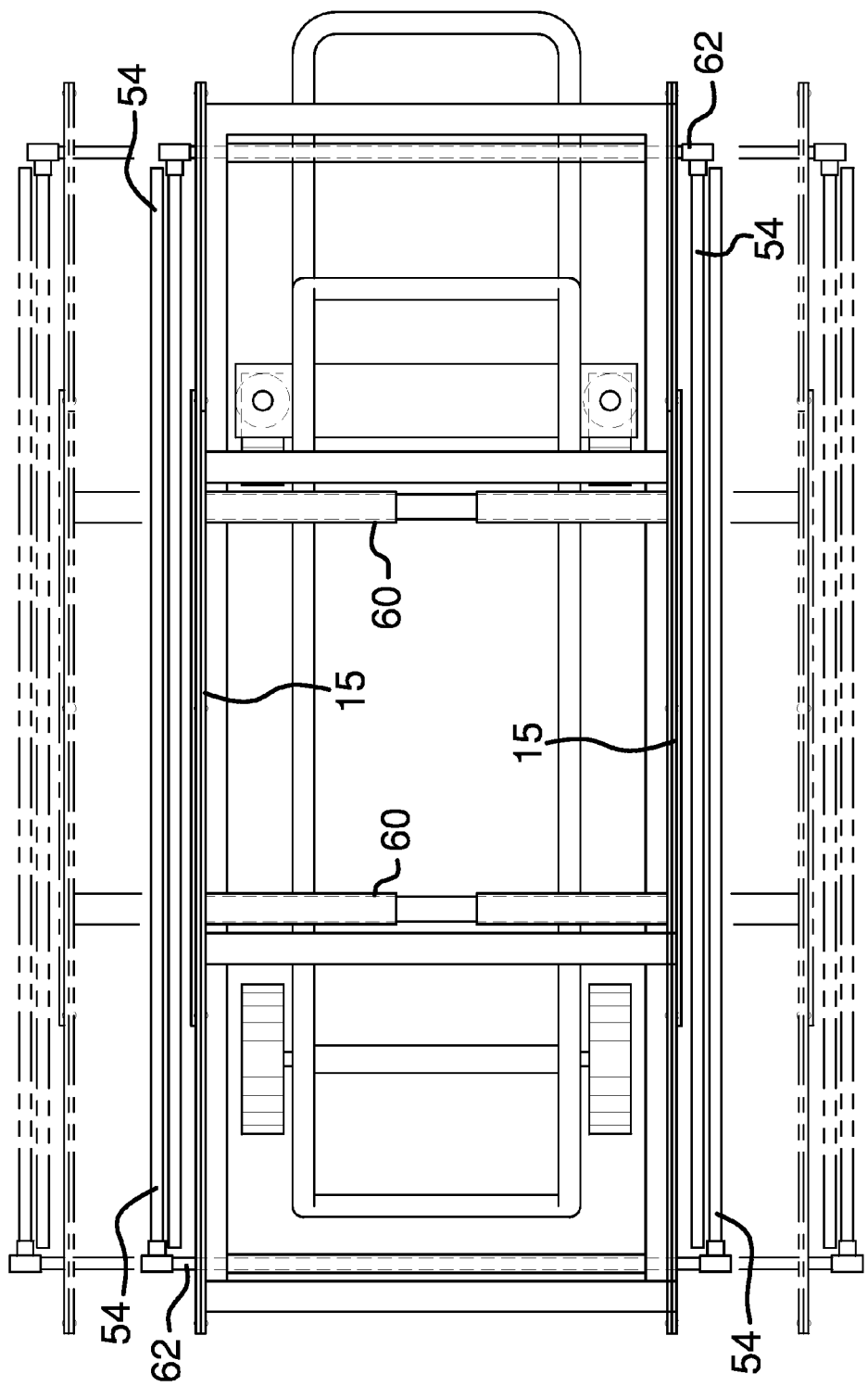
FIG. 8 is a top plan view of the dolly adapter installed on the platform dolly.

With reference now to the drawings, and in particular FIGS. 1 through 8 thereof, an example of the dolly adapter employing the principles and concepts of the present dolly adapter and generally designated by the reference number 10 will be described.

Referring to FIGS. 1 through 8, the dolly adapter 10 is illustrated. The dolly adapter 10 comprises a scissor fence 15 having a top end 17, a bottom end 18, and a plurality of alternating front legs 30 and back legs 32. Each of the front legs 30 and back legs 32 has an outer section 33. A plurality of center pivots 34 separately and sequentially joins the front legs 30 to the back legs 32, respectively. A mount 34A comprises the final center pivot 34 at the bottom end 18. The mount 34A is configured to affix to an existing dolly.

A plurality of lateral pivots 36 sequentially and separately joins a substantial number of the outer sections 33 of the front legs 30 to the back legs 32, respectively. A hinge 40 is disposed on each front leg 30 and each back leg 32. The hinges 40 are disposed most proximal to the lateral pivots 36. A pair of spaced apart hooks 50 is affixed to the existing dolly. The scissor fence 15 is selectively expanded, the top end 17 front leg 30 and back leg 32 removably hooked over the hooks 50. A barrier is formed against the existing dolly with the expanded scissor fence 15. Unhooking the top end 17 provides for the scissor fence 15 to selectively collapse to the mount 34A. The outer sections 33 are selectively folded inwardly to a position parallel the front legs 30 and the back legs 32.

With a plurality of minor parts additions, the dolly adapter 10 is also configured for use on an existing platform dolly. A pair of identical scissor fences 15 is provided for use. Each scissor fence 15 comprises a top end 17, a bottom end 18 and a plurality of alternating front legs 30 and back legs 32. Each front leg 30 at the top end 17 and at the bottom end 18 further comprises a back segment 32A. Each back leg 32 at the top end 17 and the bottom end 18 further comprises a front segment 30A. A plurality of center pivots 34 separately and sequentially joins the front legs 30 to the back legs 32, respectively. A plurality of lateral pivots 36 separately and sequentially joins the front legs 30 and the back legs 32, respectively. One lateral pivot 36 joins each front segment 30A to one back leg 32, respectively at the top end 17 and the bottom end 18. One lateral pivot 36 joins each back segment 32A to one front leg 30, respectively, at the top end 17 and the bottom end 18. A first horizontal member 22 is pivotally affixed to the top end 17 front segment 30A and back segment 32A. A second horizontal member 24 is pivotally affixed to the bottom end 18 front segment 30A and the back segment 32A. A middle pivot 38 sequentially joins the front legs 30 to the back legs 32, respectively. The middle pivots 38 are disposed between the center pivots 34 and the lateral pivots 36.

A pair of parallel spaced apart telescopic members 60 is affixed to an existing platform dolly. The telescopic members 60 are joined at a perpendicular to the second horizontal members 24 of the two scissor fences 15. A duplicate pair of spaced apart telescopic rods 62 is affixed to the existing platform dolly. A stanchion 54 is pivotally affixed to an each end of the telescopic rods 62. Each stanchion 54 has a stanchion top 63. A releasable fastener 64 is affixed proximal to each stanchion top 63. The scissor fences 15 are selectively positioned in an expanded state via the releasable fasteners

What is claimed is:

1. A dolly adapter comprising:
    a pair of identical scissor fences, each scissor fence comprising:
        a top end, a bottom end, a plurality of alternating front legs and back legs, each front leg at the top end and at the bottom pivotally joined to a back segment, each back leg at the top end and the bottom end pivotally joined to a front segment;
        a plurality of center pivots separately and sequentially joining the front legs to the back legs, respectively;
        a plurality of lateral pivots separately and sequentially joining the front legs and the back legs, respectively, one lateral pivot joining each front segment to one back segment, respectively, one lateral pivot joining each back segment to one front segment, respectively;
        a first horizontal member pivotally joined to the top end front segment and back segment;
        a second horizontal member pivotally joined to the bottom end front segment and back segment;
        a plurality of middle pivots sequentially and separately joining the front legs to the back legs, respectively;
    a pair of parallel spaced apart telescopic members affixed to an existing platform dolly, the telescopic members joined at a perpendicular to the second horizontal members;
    a duplicate pair of spaced apart telescopic rods affixed to the existing platform dolly;
    a stanchion pivotally affixed to an each end of each of the telescopic rods, each stanchion having a stanchion top; and
    a releasable fastener affixed proximal to each stanchion top;
    wherein the fences are selectively positioned in an expanded state via the releasable fasteners.

\* \* \* \* \*